(12) United States Patent
Payne et al.

(10) Patent No.: US 8,615,460 B1
(45) Date of Patent: Dec. 24, 2013

(54) COMPUTER BASED SYSTEM FOR PRICING AN INDEX-OFFSET DEPOSIT PRODUCT

(71) Applicant: Genesis Financial Development, Inc., Mississauga (CA)

(72) Inventors: Richard C. Payne, Mississauga (CA); John A. Rose, Toronto (CA); Marc G. Verrier, Victoria (CA)

(73) Assignee: Genesis Financial Development, Inc., Mississauga, Ontario (CA)

( * ) Notice: Subject to any disclaimer, the term of this patent is extended or adjusted under 35 U.S.C. 154(b) by 0 days.

(21) Appl. No.: 13/771,713

(22) Filed: Feb. 20, 2013

Related U.S. Application Data

(63) Continuation-in-part of application No. 13/763,845, filed on Feb. 11, 2013, and a continuation of application No. 13/160,012, filed on Jun. 14, 2011, now Pat. No. 8,374,941, and a continuation-in-part of application No. 12/538,488, filed on Aug. 10, 2009, now Pat. No. 7,987,132, and a continuation of application No. 10/463,180, filed on Jun. 16, 2003, now Pat. No. 7,590,581.

(51) Int. Cl.
*G06Q 40/00* (2012.01)

(52) U.S. Cl.
USPC .......................................... 705/36 R; 705/35

(58) Field of Classification Search
USPC ...................................................... 705/35–40
See application file for complete search history.

(56) References Cited

U.S. PATENT DOCUMENTS

| | | | |
|---|---|---|---|
| 7,801,824 B1 * | 9/2010 | Bryar et al. | 705/65 |
| 8,090,643 B2 * | 1/2012 | Neyman et al. | 705/37 |
| 2009/0313050 A1 * | 12/2009 | Payne et al. | 705/4 |

\* cited by examiner

*Primary Examiner* — Thu Thao Havan
(74) *Attorney, Agent, or Firm* — McDonnell Boehnen Hulbert & Berghoff LLP

(57) ABSTRACT

A computer-based method for determining a value of an index-offset deposit product, having a principal amount, a term, a specified guaranteed amount, and an index credit comprising the step of setting trial values for fixed-income-linked crediting parameters for the product implying an expected fixed-income-linked credit component at the end of the term. The method further comprises the steps of determining a cost for an option paying an index-linked credit component such that a composite index credit together with the principal is at least equal to a specified guaranteed amount.

8 Claims, 7 Drawing Sheets

Capital Protection Annuity - Interactive Pricing - Version 1.2

Current Yield Curve

| (Coupon) Treasury Yields | 1 | 2 | 3 | 5 | 7 | 10 | 20 | Assumed Coupon | |
|---|---|---|---|---|---|---|---|---|---|
| | 1.34 | 1.72 | 2.17 | 3.05 | 3.58 | 4.01 | 4.93 | 3.00 | Strip |
| Resulting Zero Yields | 1.340 | 1.726 | 2.188 | 3.106 | 3.667 | 4.130 | 5.259 | | |

NA-GARCH Equity Parameters

| c | 1.1626318 | lambda | 0.050674 | beta0 | 2.15587e-6 | beta1 | 0.899101 |
|---|---|---|---|---|---|---|---|
| beta2 | 0.0375993 | obs/yr | 253 | div | 1.25 | InstVol | 25 |

Declared Rate Annuity

| | 1 | 2 | 3 | 4 | 5 | 6 | 7 | | PV |
|---|---|---|---|---|---|---|---|---|---|
| Declared Rate | 3.68 | 3.68 | 3.68 | 3.68 | 3.68 | 3.68 | 3.68 | Get PV | 0.99858 |

Capital Protection Annuity

Treas Alloc 100    Equity Alloc 0    Equity Participation Rate 100

Treasury Participation

| | | 1 | 2 | 3 | 4 | 5 | 6 | 7 |
|---|---|---|---|---|---|---|---|---|
| Base Rate | 3.68 | Floor Rate | 2.00 | 2.00 | 2.00 | 2.00 | 2.00 | 2.00 | 2.00 |
| Upside | 0.00 | Cap Rate | 99.00 | 99.00 | 99.00 | 99.00 | 99.00 | 99.00 | 99.00 |
| Downside | 0.00 | Avg Credit | 3.680 | 3.680 | 3.680 | 3.680 | 3.680 | 3.680 | 3.680 |

Vol vs. Historical (1978-2000) 3.00    Scenarios 50000    Get PV    PV 1.00090    Delta 0.00000

Interest Rate Exposures - Change in MV(Liab) for 1% increase in Forward Rate

| 1 | 2 | 3 | 4 | 5 | 6 | 7 | 8 |
|---|---|---|---|---|---|---|---|
| -0.9843 | -0.9768 | -0.9672 | -0.9587 | -0.9499 | -0.9516 | -0.9461 | 0.0021 |
| 9 | 10 | 11 | 12 | 13 | 14 | 15 | |
| -0.0037 | 0.0020 | -0.0050 | 0.0021 | 0.0130 | 0.0207 | 0.0000 | Get Exposures |

Fig. 1

Capital Protection Annuity - Interactive Pricing - Version 1.2

Current Yield Curve

| | 1 | 2 | 3 | 5 | 7 | 10 | 20 | Assumed Coupon | |
|---|---|---|---|---|---|---|---|---|---|
| (Coupon) Treasury Yields | 1.34 | 1.72 | 2.17 | 3.05 | 3.58 | 4.01 | 4.93 | 3.00 | Strip |
| Resulting Zero Yields | 1.340 | 1.726 | 2.188 | 3.106 | 3.667 | 4.130 | 5.259 | | |

NA-GARCH Equity Parameters

| c | 1.1626318 | lambda | 0.050674 | beta0 | 2.15587e-6 | beta1 | 0.899101 |
|---|---|---|---|---|---|---|---|
| beta2 | 0.0375993 | obs/yr | 253 | div | 1.25 | InstVol | 25 |

Declared Rate Annuity

| | 1 | 2 | 3 | 4 | 5 | 6 | 7 | | PV |
|---|---|---|---|---|---|---|---|---|---|
| Declared Rate | 3.68 | 3.68 | 3.68 | 3.68 | 3.68 | 3.68 | 3.68 | Get PV | 0.99858 |

Capital Protection Annuity

Treas Alloc 100    Equity Alloc 0    Equity Participation Rate 100

Treasury Participation

| | | 1 | 2 | 3 | 4 | 5 | 6 | 7 |
|---|---|---|---|---|---|---|---|---|
| Base Rate | 1.72 | Floor Rate | 1.72 | 1.72 | 1.72 | 1.72 | 1.72 | 1.72 | 1.72 |
| Upside | 1.00 | Cap Rate | 99.00 | 99.00 | 99.00 | 99.00 | 99.00 | 99.00 | 99.00 |
| Downside | 1.00 | Avg Credit | 1.720 | 2.424 | 2.759 | 2.998 | 3.110 | 3.215 | 3.380 |

Vol vs. Historical (1978-2000) 3.00    Scenarios 50000    Get PV    PV 0.99908    Delta 0.00000

Interest Rate Exposures – Change in MV(Liab) for 1% increase in Forward Rate

| 1 | 2 | 3 | 4 | 5 | 6 | 7 | 8 |
|---|---|---|---|---|---|---|---|
| -0.9843 | -0.8741 | -0.7550 | -0.6342 | -0.5174 | -0.4017 | -0.2889 | 0.8678 |
| 9 | 10 | 11 | 12 | 13 | 14 | 15 | |
| 0.7469 | 0.6339 | 0.4552 | 0.3319 | 0.2020 | 0.0387 | 0.0000 | Get Exposures |

Fig. 2

Capital Protection Annuity - Interactive Pricing - Version 1.2

Current Yield Curve

| (Coupon) Treasury Yields | 1 | 2 | 3 | 5 | 7 | 10 | 20 | Assumed Coupon | |
|---|---|---|---|---|---|---|---|---|---|
| | 1.34 | 1.72 | 2.17 | 3.05 | 3.58 | 4.01 | 4.93 | 3.00 | Strip |
| Resulting Zero Yields | 1.340 | 1.726 | 2.188 | 3.106 | 3.667 | 4.130 | 5.259 | | |

NA-GARCH Equity Parameters

| c | 1.1626318 | lambda | 0.050674 | beta0 | 2.15587e-6 | beta1 | 0.899101 |
|---|---|---|---|---|---|---|---|
| beta2 | 0.0375993 | obs/yr | 253 | div | 1.25 | InstVol | 25 |

Declared Rate Annuity

| | 1 | 2 | 3 | 4 | 5 | 6 | 7 | | PV |
|---|---|---|---|---|---|---|---|---|---|
| Declared Rate | 3.68 | 3.68 | 3.68 | 3.68 | 3.68 | 3.68 | 3.68 | Get PV | 0.99858 |

Capital Protection Annuity

Treas Alloc 50   Equity Alloc 50   Equity Participation Rate 100

Treasury Participation

| | | 1 | 2 | 3 | 4 | 5 | 6 | 7 |
|---|---|---|---|---|---|---|---|---|
| Base Rate | 4.00 | Floor Rate 4.00 | 4.00 | 4.00 | 4.00 | 4.00 | 4.00 | 4.00 |
| Upside | 0.00 | Cap Rate 99.00 | 99.00 | 99.00 | 99.00 | 99.00 | 99.00 | 99.00 |
| Downside | 0.00 | Avg Credit 4.000 | 4.000 | 4.000 | 4.000 | 4.000 | 4.000 | 4.000 |

Vol vs. Historical (1978-2000) 3.00   Scenarios 50000   Get PV   PV 1.00025   Delta 0.40909

Interest Rate Exposures - Change in MV(Liab) for 1% increase in Forward Rate

| 1 | 2 | 3 | 4 | 5 | 6 | 7 | 8 |
|---|---|---|---|---|---|---|---|
| -0.5820 | -0.5716 | -0.5570 | -0.5501 | -0.5418 | -0.5438 | -0.5498 | -0.0039 |
| 9 | 10 | 11 | 12 | 13 | 14 | 15 | |
| -0.0100 | -0.0067 | -0.0155 | -0.0050 | 0.0067 | 0.0169 | 0.0000 | Get Exposures |

Fig. 3

Capital Protection Annuity - Interactive Pricing - Version 1.2

Current Yield Curve

| (Coupon) Treasury Yields | 1 | 2 | 3 | 5 | 7 | 10 | 20 | Assumed Coupon | |
|---|---|---|---|---|---|---|---|---|---|
| | 1.34 | 1.72 | 2.17 | 3.05 | 3.58 | 4.01 | 4.93 | 3.00 | Strip |
| Resulting Zero Yields | 1.340 | 1.726 | 2.188 | 3.106 | 3.667 | 4.130 | 5.259 | | |

NA-GARCH Equity Parameters c 1.1626318   lambda 0.050674   beta0 2.15587e-6   beta1 0.899101 beta2 0.0375993   obs/yr 253   div 1.25   InstVol 25

Declared Rate Annuity

| | 1 | 2 | 3 | 4 | 5 | 6 | 7 | | |
|---|---|---|---|---|---|---|---|---|---|
| Declared Rate | 3.68 | 3.68 | 3.68 | 3.68 | 3.68 | 3.68 | 3.68 | Get PV | PV 0.99858 |

Capital Protection Annuity

Treas Alloc 50   Equity Alloc 50   Equity Participation Rate 100

Treasury Participation

| | | 1 | 2 | 3 | 4 | 5 | 6 | 7 |
|---|---|---|---|---|---|---|---|---|
| Base Rate | 1.63 | Floor Rate | 1.63 | 1.63 | 1.63 | 1.63 | 1.63 | 1.63 | 1.63 |
| Upside | 1.00 | Cap Rate | 99.00 | 99.00 | 99.00 | 99.00 | 99.00 | 99.00 | 99.00 |
| Downside | 1.00 | Avg Credit | 1.630 | 2.334 | 2.669 | 2.908 | 3.020 | 3.125 | 3.290 |

Vol vs. Historical (1978-2000) 3.00   Scenarios 50000   Get PV   PV 1.00034   Delta 0.38991

Interest Rate Exposures – Change in MV(Liab) for 1% increase in Forward Rate

| 1 | 2 | 3 | 4 | 5 | 6 | 7 | 8 |
|---|---|---|---|---|---|---|---|
| -0.5976 | -0.5452 | -0.4885 | -0.4272 | -0.3750 | -0.3283 | -0.2897 | 0.3471 |

| 9 | 10 | 11 | 12 | 13 | 14 | 15 |
|---|---|---|---|---|---|---|
| 0.2962 | 0.2562 | 0.1726 | 0.1304 | 0.0877 | 0.0313 | 0.0000 |

Get Exposures

COMPUTER BASED SYSTEM FOR PRICING AN INDEX-OFFSET DEPOSIT PRODUCT

CROSS-REFERENCE TO RELATED APPLICATIONS

This application is a continuation of application Ser. No. 13/763,845 filed Feb. 11, 2013 which is a continuation of application Ser. No. 13/160,012 filed Jun. 14, 2011 and now issued as U.S. Pat. No. 8,374,941, which is a continuation in part application of application Ser. No. 12/538,488 filed Aug. 10, 2009 and now issued as U.S. Pat. No. 7,987,132, which is a continuation of application Ser. No. 10/463,180 filed Jun. 16, 2003 and now issued as U.S. Pat. No. 7,590,581, all of which are herein incorporated entirely by reference.

BACKGROUND

Field of the Invention

The present invention relates generally to financial products, more specifically to computer-based systems for pricing financial products, and, even more particularly, to a computer-based system for pricing an index-offset deposit product.

Background of the Invention

A call option is a financial instrument that gives its holder the right (but not the obligation) to purchase a given security at a pre-specified price, called the strike price or exercise price, from the option seller. This structure allows the option holder to profit if the price of the security exceeds the strike price at the time of expiry of the option. At the same time, the maximum possible loss to the holder is limited to the price paid for the option if the security is worth less than the exercise price, since the holder is not forced to buy the security at an above-market price.

Options usually have a limited lifespan (the term) and have two main styles of exercise, American and European. In an American-exercise call option, the security may be purchased for its strike price at any time during the term. In a European-exercise call option, in contrast, the security may only be purchased at the end of the term.

An indexed call option is one in which the role of "securities price" is played by an index such as the S&P 500 or the Nasdaq 100. Since delivering the basket of securities that comprise the index is usually impractical, indexed call options are usually cash-settled. This means that if the index is greater than the strike price at time of exercise, the option seller pays the option holder the difference in price in cash: if the index is less than or equal to the strike, no payment is made.

Many investors currently purchase indexed call options directly to help achieve a desired balance of risk and return in their investment portfolios. Many investors and consumers also benefit indirectly from investments in such options when they buy index-linked deposit products such as indexed annuities or indexed certificates of deposit (CD's). This is because index-linked deposit products are usually constructed from a mixture of indexed call options and fixed-income instruments such as bonds or mortgages.

Investors and consumers obtain valuable benefits through the use of index-linked deposit products currently available in the market, such as:

a. The ability to benefit from increases in the index while protecting principal; and b. Achievement of diversification by linking investment returns to an index aggregating the performance of multiple issuers, rather than just one.

There are also some disadvantages associated with currently available index-linked products, including:

a. The lack of fixed-income linkage, i.e., the inability to take advantage of increases in interest rates after product purchase, because returns are tied to one index for the length of the term; and, b. Lower-than-desired "participation rates" (the proportion of increases in the index credited to the product), especially during times of low interest rates or high index volatility.

The last point may require explanation. Participation rates are low when interest rates are low because most of the amount deposited must be invested in fixed income to guarantee return of principal, leaving little left over to buy indexed options. Similarly, higher index volatility leads to higher option prices for the most common types of options, driving participation rates down.

The investor or consumer therefore must face the situation that achievement of index participation and a guarantee of principal generally precludes earning an attractive interest rate. A difficult choice must be made.

References useful in understanding the present invention include:

*An Introduction to the Mathematics of Financial Derivatives*, Salih N. Neftci (2001)

*Financial Calculus*, Martin Baxter and Andrew Rennie (1996)

*Martingale Methods in Financial Modelling*, MarekMusiela and MarekRutkowski (1997)

*Changes of Numeraire, Changes of Probability Measure and Option Pricing*, Geman, H., El Karoui, N. and Rochet, J. C. (1995)

*Arbitrage Theory in Continuous Time*, Tomas Bjork (1998)

*Beyond average intelligence*, Michael Curran, Risk 5 (10), (1992)

*The complete guide to option pricing formulas*, Espen Gaarder Haug, 1997

*Measuring and Testing the Impact of News on Volatility*, Robert F. Engle & Victor K. Ng (1993)

*Option Pricing in ARCH-Type Models*, Jan Kallsen & Murad S. Taqqu (1994)

*The GARCH Option Pricing Model*, Jin-Chuan Duan (1995)

*Pricing Options Under Generalised GARCH and Stochastic Volatility Processes*, Peter Ritchken & Rob Trevor (1997)

*An Analytical Approximation for the GARCH option pricing model* by Jin-Chuan Duan, Geneviève Gauthier, and Jean-Guy Simonato (2001)

*The Market Model of Interest Rate Dynamics*, Alan Brace, Dariusz Gatarek, and Marek Musiela (1997)

*A Simulation Algorithm Based on Measure Relationships in the Lognormal Market Models*, Alan Brace, Marek-Musiela, and Erik Schlogl (1998)

*LIBOR and swap market models and measures*, Farshid Jamshidian (1997)

*Interest Rate Models Theory and Practice*, Damiano Brigo & Fabio Mercurio (2001)

*Drift Approximations in a Forward-Rate-Based LIBOR Market Model*, C. J. Hunter, P. Jäckel, and M. S. Joshi (2001)

*The Market Price of Credit Risk: An Empirical Analysis of Interest Rate Swap Spreads* by Jun Liu, Francis A. Longstaff, and Ravit E. Mandell (2000)

*Modern Pricing of Interest-Rate Derivatives*, Riccardo Rebonato (2002)

*An Empirical Comparison of GARCH Option Pricing Models*, K. C. Hsieh, Peter Ritchken (2000)

*Modern Portfolio Theory and Investment Analysis* (4th ed.), Edwin J. Elton and Martin J. Gruber (1991)

*The Art of Computer Programming, Vol. 2*, Donald E. Knuth, Addison-Wesley (1969)

*The Art of Computer Programming, Vol. 3*, Donald E. Knuth, Addison-Wesley (1973)

*Algorithms*, Robert Sedgewick (1983)

*Handbook of Mathematical Functions (AMS55)*, Milton Abramowitz and Irene A. Stegun (1972)

*Matrix Computations*, Gene H. Golub and Charles F. Van Loan (1989)

*Numerical Methods*, Germund Dahlquist and Ake Bjorck, Prentice-Hall (1974)

*Algorithms for Minimization without Derivatives*, R. P. Brent, Prentice-Hall (1973)

*Numerical Recipes in C*, William H. Press, William T. Vetterling, Saul A. Teukolsky, Brian P. Flannery, Cambridge University Press, 1992

*Numerical Solution of Stochastic Differential Equations* Peter E. Kloeden and Eckhard Platen, (1995)

*Stochastic Simulation*, Brian D. Ripley, Wiley (1987)

*Intel Architecture Optimization Reference Manual*, Intel (1998)

*Inner Loops* by Rick Booth (1997)

*The Software Optimization Cookbook*, Richard Gerber, Intel Press (2002)

*Principles of Compiler Design* by Alfred V. Aho and Jeffrey D. Ullman (1977)

*File Structures: An Analytic Approach*, Betty Joan Salzberg (1988)

*A Very Fast Shift-Register Sequence Random Number Generator*, Scott Kirkpatrick and Erich P. Stoll, Journal of Computational Physics 40, (1981) 517-526

*Monte Carlo Simulations: Hidden Errors from "Good" Random Number Generators*, A. M. Ferrenberg, Y. J. Wong, and D. P. Landau (1992)

*The Ziggurat Method for Generating Random Variables*, George Marsaglia and Wai Wan Tsang (2000)

*Remark on Algorithm 659: Implementing Sobol's quasirandom sequence generator*, Stephen Joe and Frances Y. Kuo, ACM Transactions on Mathematical Software, March 2003

*A comparison of three methods for selecting values of input variables in the analysis of output from a computer code*, M. D. McKay, R. J. Beckman, and W. J. Conover, *Technometrics*, 21 (2):239-245, (1979)

*Elements of Sampling Theory*, Vic Barnett (1974)

*Singular Value Decomposition and Least-Squares Solutions*, G. H. Golub and C. Reinsch, in J. H. Wilkinson and C. Reinsch (editors), *Handbook for automatic computation, vol. II: "Linear Algebra"*, Springer Verlag (1974)

Accordingly, there is a need for an indexed deposit product structure permitting the purchaser to enjoy an attractive combination of a plurality of index-linkages and at least one fixed-income-linkage while guaranteeing a specified percentage of principal. The plurality of index-linkages may take the form of a combination or a blended index of two or more indices. There is also a general need for an indexed deposit product structure that permits a purchaser to increase a credited value to the indexed deposit product by computing an initial average value of at least one equity index at the start of a term. Alternatively, the step of calculating an index credit using a percentage of an increase in an equity index uses an initial average of the equity index at the start of the term (i.e., indexing period) and a final average at the end of the term (i.e., indexing period). There is correspondingly a need for a computer-based system for pricing such an indexed deposit product structure.

SUMMARY OF THE INVENTION

In one aspect, the present invention comprises a computer-based method for determining a value of an index-offset deposit product, having a principal amount P, a term T, a specified guaranteed amount G, and an index credit C. The method comprises the step of setting trial values for fixed-income-linked crediting parameters for the product implying an expected fixed-income-linked credit component F at the end of the term T and determining a cost for an index option paying an index-linked credit component E equal to the sum of one or more index-linked credit subcomponents $E_i$, $E=\Sigma E_i$, such that the index credit C=E+F, to be paid at T, together with the principal P, is at least equal to G. The method further comprises the step of summing the index option cost, present value of principal, and present value of fixed-income-linked credit component to determine said value of said index-offset deposit product.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

The nature and mode of operation of the present invention will now be more fully described in the following detailed description of the invention taken with the accompanying drawing figures, in which:

FIG. 1 is a screen shot which shows how the program can be used to calculate the rate sensitivities of a traditional rate annuity;

FIG. 2 is a screen shot which shows how the program can be used to calculate the price and interest rate sensitivities of a product with fixed income linked index credits with the equity index allocation still at zero;

FIG. 3 is a screen shot which shows how the program can be used to calculate the price and interest rate sensitivities of a product with a constant base rate and with an equity index allocation of 50%;

FIG. 4 is a screen shot which shows how the program can be used to calculate the price and interest rate sensitivities of a product with a treasury linked base rate and with an equity index allocation of 50%;

Figure 5:
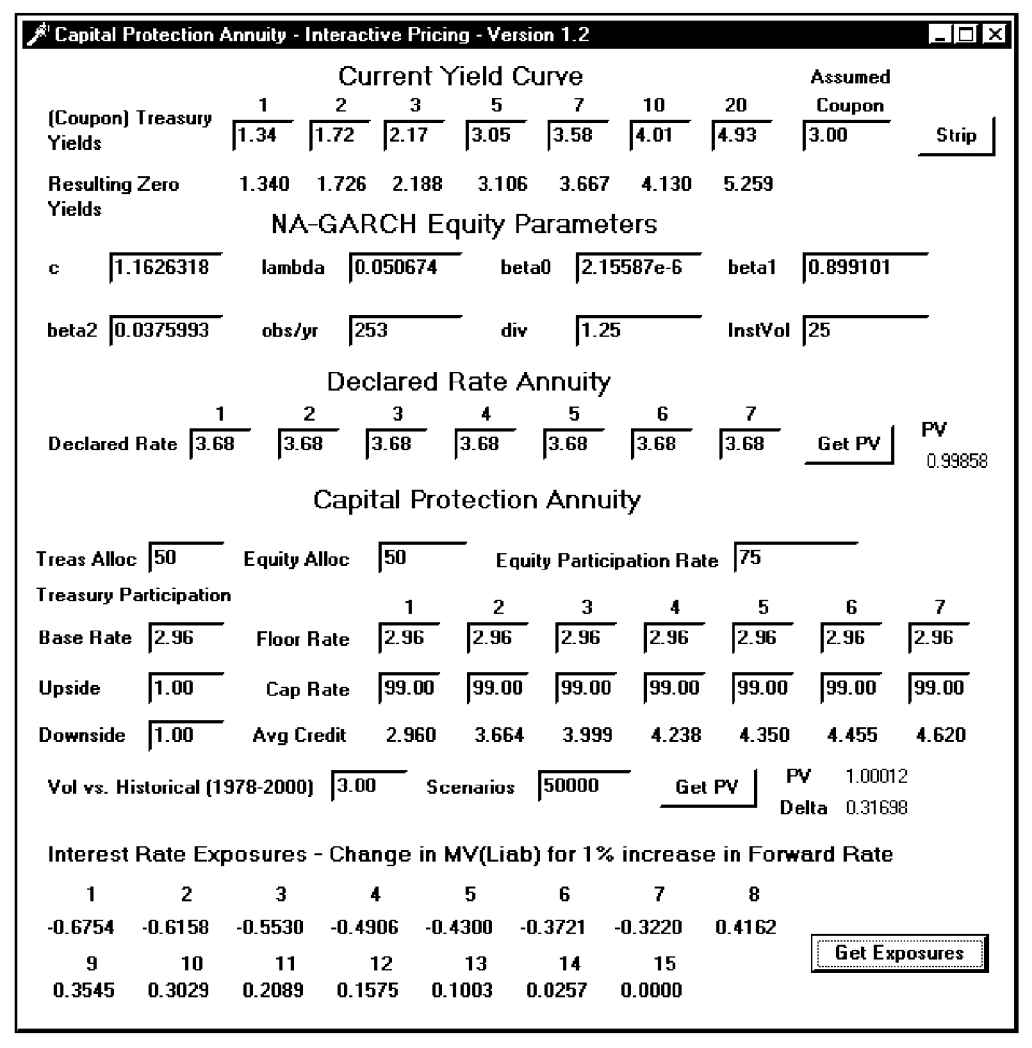

FIG. 5 is a screen shot similar to that of FIG. 4 but showing that an equity participation rate of 75% has been introduced;

DETAILED DESCRIPTION

General Description

Figure 6:
FIG. 6 is a screen print illustrating the method of operation of the find_cpp operation; and, FIG. 7 is a screen print illustrating the method of operation of the cpp_patc operation.
Figure 7:

A brief description of an index-offset deposit product is one that provides the purchaser with a notional allocation of principal to index-linked and fixed-income-linked allocations and two guarantees:

a guarantee that a specified percentage (often 100%) of principal will be paid to the holder at the end of a specified term, and a guarantee that the composite index credit computed from the index-linked components and fixed-income-linked index credit components at the end of the term will be non-negative, i.e., that positive and negative index credit components from the index-linked notional allocation and the at least one fixed-income-linked notional allocations can offset each other so long as the composite index credit itself is nonnegative.

In one arrangement, the index credit component for the index-linked notional allocation may be based on a single published index such as the S&P 500 index or NASDAQ index. Alternatively, the index credit component for the index-linked notional allocation may be derived from a blend or a combination of more than one index. As just one example, the index credit component may be derived in part from the S&P 500 index in combination with at least one other index such as the NASDAQ index or the Barclays Capital Aggregate Bond Index (formerly referred to as the Lehman Aggregate Bond Index). The indices may be weighted, for example, so that S&P 500 returns have a weight of 60% and Barclays Capital Aggregate Bond Index returns have a weight of 40%. As those of skill in the art will recognize, other index blending and/or combination arrangements may also be used.

In yet another alternative arrangement, the percentage change of the equity index is measured by comparing a starting average value S of the equity index at the start of the Term to an Equity Index Ending Value E. The starting average value S may comprise an average of a single index or it may be derived from a blend or a combination of more than one index.

With such an average starting method, the Equity Index Starting Value is computed as an average over a discrete set of points. For example, such averaging may be computed over a certain number of months so as to reduce the risk of entering the market immediately before a step decline, thereby allowing a purchaser to enter the market systematically. As those of skill in the art will recognize, other index averaging and/or combination arrangements may also be used.

The index credit component for the fixed-income-linked notional allocation may be based on a Treasury-based or Libor-based interest rate (external index) or may be based on rates declared by the issuer (internal index). We refer to a Constant Maturity Treasury rate and zero-coupon bond yields below for the fixed-income-linked notional allocation for the sake of concreteness, but the extension to different external and internal interest indices is straightforward.

Having defined a generic index-offset deposit product, we can define specific index-offset deposit products, such as deferred annuities, life insurance, certificates of deposit, and bonds, as specializations of the generic product. Index credits for such products are calculated from fixed income and indexed notional allocations and index credit component parameters, with a guarantee that a specified percentage of principal will be paid at the end of the term.

The index-offset deposit product has some features in common with indexed deposit structures that have previously been described in the literature, (see, e.g., U.S. Pat. No. 6,343,272, a system for managing equity-indexed life and annuity policies). However, there are important differences between the present invention and prior products, which lead to the present invention being a more efficient product, i.e., providing a more attractive combination of index-linkage and fixed-income linkage under the constraint that a specified percentage of principal must be guaranteed. The key differences are:
  a. The notional index-linked and fixed-income-linked allocation of principal, and
  b. The guarantee that the index credit itself, although not each index credit component or subcomponent separately, will be nonnegative.

These differences make the product more difficult to price than existing indexed products, especially in the general case in which the fixed-income-linked credit component is indexed to a Treasury or Libor-based rate, because the interest-rate and index risks interact. Key interactions include:
  a. the dependence of arbitrage-free pricing for index options on realized short-term risk-free interest rates, so that index exposures vary depending on the shape, level, and volatility of the yield curve, and
  b. the fact that the index credit at the end of the term, and hence interest rate exposures, depend on the expected index credit component from the index-linked notional allocation, because of the potential for offset between the index-linked and fixed-income-linked index credit components.

Pricing a product with such interactions requires the development of software specifically designed to take these interacting risks into account.

Detailed Description of Product Mechanics

The principal paid for the index-offset deposit product is notionally allocated to the index-linked allocation and the fixed-income-linked allocation. The notional allocation percentages are determined by the issuer, not the purchaser, and might be (for example) 50% each. For example, the notional allocation percentage of 50% for the index-linked allocation may be split among two or more indices (with returns weighted 50%/50% or 60%/40%, for example) so as to create a blended index.

In one exemplary arrangement, index-linked and fixed-income-linked credit components are determined over each term and the index credit is calculated at the end of the term. The length of the term might be 5 to 7 years for a typical product. Alternatively, in one exemplary arrangement, a first index-linked and a first fixed-income-linked credit components are determined over a first period of time (e.g., a term) and a second index-linked credit component may be determined over a second period of time. In one preferred arrangement, the index credit may then be calculated at the end of both the first term and the second term. Alternatively, average index values of a single index or a blend of indices may be used at the start of the indexing term T and may also be used at the end of the indexing term T.

The fixed-income-linked credit component may be determined by compounding together the "base rates" for each year of the term. In this compounding, the base rate is taken to be at least as large as a specified floor rate (e.g., 2%, varying by year of the term), but no larger than a specified cap rate (e.g., 8%, once again varying by year of the term).

The base rate for the first year of the term is declared by the issuer (e.g., 2%). At successive intervals during the term (e.g., annually), the base rate changes by a percentage of the change in a benchmark yield, such as the 5-Year Constant Maturity Treasury rate, or the yield on a 5-year zero-coupon bond. Different percentages (participation rates) may apply to increases and decreases, and the percentages may be positive or negative.

The first indexed credit subcomponent may be based on a percentage (e.g., 100%) of the (signed) increase in the first index over the term, measured from the starting point to the end value, or to an average value such as the weekly average of the first index over the last quarter (3 months) of the term. Such an index may be the Nasdaq 500. Similarly, a second indexed credit subcomponent may be based on a percentage (e.g., 100%) of the (signed) increase in the index over the term, measured from the starting point to the end value, or to an average value such as the weekly average of the index over the last quarter (3 months) of the term. Such a second index may comprise the Russell 2000 or the EuroStoxx 50. A similar analysis may be undertaken if a third or more indexed credit subcomponent is used.

The interaction between the plurality of index credit components is that a decrease in one index can offset an increase in the other index and/or an increase in the fixed-income-linked credit component. However, a specified percentage of principal is guaranteed (e.g., the overall or composite index credit of the two or more credit components itself cannot be negative). For example, assume that 50% of the deposit is notionally allocated to a first fixed-income-linked credit component and 50% is notionally allocated to an index-linked credit component comprising two or more indices, i.e. having two or more index-linked credit subcomponents.

Risk Management Considerations

Risk management for deposit products usually requires attention to the index exposures created by the product (for index-linked products) and to the interest-rate exposures created by the product (for fixed-income-linked and index-linked products). Risk management considerations for Applicants' proposed systems and methods are more complicated than for currently available products in at least three ways:

Sensitivity to Forward Interest Rates

Deposit-taking institutions such as banks and insurance companies have typically managed their assets and liabilities to try to minimize the difference between asset duration and convexity and liability duration and convexity. A good discussion of duration and convexity for deposit products is found in *The Management of Bond Portfolios* (Chapter 19 of *Modern Portfolio Theory and Investment Analysis*, by Edwin J. Elton and Martin J. Gruber).

Use of duration and convexity for insurance carriers, for example, is so widely accepted that it has been formalized in regulations such as New York Regulation 127, which uses Macaulay duration as the criterion for determining how well the assets and liabilities of a carrier are matched.

Duration and convexity measures, which assume parallel shifts in the yield curve, are not very useful in managing a more general fixed-income-linked product like the current invention. The interest-rate exposure created by indexing to, for example, a Constant Maturity Treasury, is considerably different than the exposure arising from guaranteeing a fixed interest rate.

Measuring the sensitivity of the market value of the liability to changes in individual forward rates is a more generally useful methodology than measuring duration and convexity. The following example (for a five-year term) shows the difference in sensitivity to forward interest rates for a fixed-income-linked product with no index linkage:

| Forward Rate | GIC | Fixed-Income Linked |
|---|---|---|
| 1 | −0.98 | −0.98 |
| 2 | −0.98 | −0.77 |
| 3 | −0.97 | −0.55 |
| 4 | −0.96 | −0.37 |
| 5 | −0.95 | −0.21 |
| 6 | 0.00 | 0.75 |
| 7 | 0.00 | 0.55 |
| 8 | 0.00 | 0.33 |
| 9 | 0.00 | 0.16 |
| 10 | 0.00 | 0.00 |
| Total | −4.84 | −1.09 |

The "Total" row shows duration, as traditionally measured. For a traditional deposit product, like a Guaranteed Investment Contract (GIC) the total is useful information, showing essentially the duration of a zero-coupon bond broken out by the forward rates. The total in the Fixed-Income Linked exposures (which assume 100% linkage to upward moves in the 5-Year CMT rate and 50% linkage to downward moves) is not very useful, as it is a sum of positive and negative components that are not level by forward period. Backing a five-year GIC with a five-year zero-coupon bond would achieve a good asset/liability match, but backing the above fixed-income-linked product with a 1.1 year bond would be very risky if the yield curve were to steepen.

Forward Rate/Index Interaction

Interest-rate exposures for options are usually captured by a measure called rho, which assumes (like duration and convexity) that yield curve shifts are parallel. For this product, these interest rate exposures must be broken out by individual forward rates in the same way as in the previous item, to allow them to be managed properly under the assumption that yield curve shifts need not be parallel.

Index-Linked/Fixed-Income-Linked Interaction

The simple example above does not take into account the interaction between the index-linked credits and the fixed-income-linked credits. Depending on the current and expected levels of the index, the amount to be credited will vary, and so its present value (and hence the interest rate exposures of the product) will also vary.

If the fixed-income-linked credits are based on an external index then the current yield curve and interest volatilities will also affect the expected amount of interest to be credited to the policy, which in turn affects index exposures because of the offset between the fixed-income-linked credit component and the index credit component or components.

Simple Pricing Example

Pricing for this product is done at the time of issue and encompasses setting the index-linked and fixed-income-linked notional allocations of principal, and then setting the crediting component parameters for each of the notional allocations. For the index-linked notional allocation, this involves setting a participation rate (which will often be set at 100% for ease of marketing and explaining the product) for the first index and second (or more) index (if used). For the fixed-income-linked notional allocation this involves setting the base rate, the upward and downward participation rates, and the cap and floor rates.

One strategy to hedge the return guaranteed to the purchaser is to buy an in-the-money indexed call option with some of the amount deposited and a 7-year zero-coupon bond with the rest. The problem is how much to invest in each of these investments to hedge the return properly. We approach this by examining the index credit component for the fixed-income-linked notional allocation, first under the assumption that it is offered in isolation from the index-linked notional allocation, and then allowing for the interaction between the index credit components.

Stand-Alone Fixed-Income-Linked Crediting Rate Example

The notional fixed-income-linked allocation may be 50% of principal. Since the overall product guarantee is 100% of principal, the "annual excess guarantee cost" is 0%. If more than 100% of principal were guaranteed at the end of the term, this "annual excess guarantee cost" would be greater than zero.

The issuer could therefore afford to credit the following on the notional fixed-income-linked allocation, if it were stand-alone rather than combined with the index-linked notional allocation, assuming an Earned Rate of 5.61% and an expense factor of 1.37%:

a. Earned Rate—expense factor—annual excess guarantee cost; or
b. 5.61%-1.37%-0%;
c. or 4.24% at the end of each year.

Discounted at 5.61% (the earned rate), the present value of 4.24% at the end of each year is 0.240009427.

Combined Fixed-Income-Linked Crediting Rate

We can solve (by bisection, regula falsi, Brent's method, or other root-finding method), that a rate of 4.828% can be credited on the fixed-income-linked notional allocation, i.e., almost 60 bp higher than the stand-alone case.

The end-of-term guarantee is 100% of principal. If the value of the index-linked notional allocation falls from 50% of principal to 30.45% of principal at the end of the term, then the index credit will be zero, and the product's value will be precisely that of the principal guarantee. If the value of the index-linked notional allocation ends above 30.45% of principal, then there will be a positive index credit. So the issuer could buy a call option that pays off if the value of the index-linked notional allocation at the end of the term is at least equal to 0.3045/0.5000 of its original value. This is equivalent to a strike price of 60.9% of the initial index value.

Now with a strike price of 60.9% of the initial index value and the above assumptions, the cost of the 7-year call option is 47.986% of the amount being hedged.

Since the index-linked notional allocation is 50% of the deposit, the cost of the index portion is 47.986% times 0.50, or 23.993% of the deposit.

Since the actual cost (23.993%) equals the available cost (24%) within rounding limits, this confirms that 4.828% is the right interest rate.

Alternate Combined Fixed-Income-Linked Crediting Rate

Another way to see that 4.828% is the right interest rate is to assume a lower rate (say 4.5%) and try to work through the logic above.

At the end of the term, the value of the fixed-income-linked notional allocation will grow to 50%×1.045$^7$, or 68.04%, of the deposit.

The end-of-term guarantee is 100% of principal. If the value of the index-linked notional allocation falls to 31.96% of the deposit by the end of the term, then the end-of-term guarantee will control, and there will be no index credit. If the value of the index-linked notional allocation ends above 31.96% of principal, then there will be a positive index credit. The issuer therefore must buy a call option that pays off if the value of the index-linked notional allocation is at least equal to 0.3196/0.5000 of its original value. This is equivalent to a strike price of 63.92% of the initial index value.

Now with a strike price of 63.92% of the initial index value, and the above assumptions, the cost of the 7-year call option is 46.266% of the amount being hedged.

Since the index-linked notional allocation is 50% of the deposit, the cost of hedging the index-linked notional allocation is 46.266% times 50% of the deposit, or 23.133% of the deposit. This is less than the 24.0% we have available to spend.

Therefore, the base rate for the fixed-income-linked notional allocation can exceed 4.5%.

Financial Models Required For Pricing

The example above shows how to price the product assuming constant interest rates and a given starting value for index volatility. This is a valid method for producing a quick approximate price and is therefore useful in its own right. However, a slower but more accurate method for pricing the product is also useful because a) index volatility is not constant but instead changes stochastically, b) interest rates vary by term to maturity (this variation by term is usually referred to as the "yield curve"), and c) interest rates are not constant but vary stochastically over time. These issues become particularly acute when the fixed-income-linked index component is tied to an external index rate, but they are important issues for the product, as described above, regardless of the exact product configuration.

A good introduction to current approaches to financial modeling of equity and interest-rate derivatives is *An Introduction to the Mathematics of Financial Derivatives* by Salih N. Neftci.

Index-Offset Deposit Product—Pricing Method

We price using the NA-GARCH (Nonlinear Asymmetric Generalized Autoregressive Conditional Heteroscedasticity) option model, allowing for stochastic index paths and stochastic index volatility, and the Libor Market Model, allowing for an arbitrary initial yield curve and stochastic interest rates. Note that the well-known Black-Scholes option pricing model can be obtained as a special case of NA-GARCH in which volatility is constant.

The fully-stochastic method for pricing the index-offset deposit product has the following steps:
a. Generate a set of yield curve scenarios consistent with valuation parameters;
b. Generate an index scenario for each yield curve scenario, consistent with the valuation parameters and the yield curve scenario;
c. Apply the index crediting parameters to determine a terminal account value for the product for each scenario;
d. Apply a market discount factor to the terminal account value for each scenario to produce a discounted terminal account value for each scenario; and
e. Compute the average of the discounted terminal account values.

A description of the key equations of the NA-GARCH Model and Libor Market Model follows.

The NA-GARCH Model
Model Domain:
Indices and Option Prices
Key Characteristics of the Model:
1. The model has risk-neutral and physical settings.
2. Index volatility is stochastic and incorporates skew.
3. Market declines are generally associated with increases in volatility.
4. Implied volatilities tend to be a little higher than physical volatilities.
5. Model allows arbitrage-free hedging and pricing of options and futures.
6. A discrete time, not SDE (stochastic differential equation), model.

Outline of Mathematical Formulation:
1. Index movements and changes in instantaneous volatility are driven by the same normal random variate.
2. Parameters control asymmetry (tendency of volatility to increase as market drops) and long-term mean volatility.

Key Equations:

$$\ln(S_{t+1}/S_t) = (r_f - d) + \lambda h_t^{1/2} - \tfrac{1}{2} h_t + h_t^{2/2} v_{t+1}$$

$$h_{t+1} = \beta_0 + \beta_1 h_t + \beta_2 h_t (v_{t+1} - c)^2$$

What The Variables Mean:
$S_{t+1}$ and $S_t$ are the values of the index at successive intervals,
$r_f$ is the risk-free yield over an interval,
d is the dividend yield on the securities comprising the index over the same interval,
$\lambda$ is a risk parameter (zero for arbitrage-free pricing),
$h_t$ is the instantaneous variance (volatility squared) over the interval, $v_{t+1}$ is a normal random variate, $\beta_0$, $\beta_1$, and $\beta_2$ are parameters controlling the level and volatility of volatility, and c is a parameter controlling asymmetry (i.e. the degree to which market declines are associated with increases in volatility).

Note: To change from the physical to the risk-neutral setting, set c:=c+λ, then set λ:=0.

Implementation Notes:

1. Applicants' proposed implementation is mostly Monte Carlo with a number of pre-computations to achieve acceptable speed: analytical approximations are not very useful for this model. Although lattice methods could be used they become difficult to apply for path-dependent options.

2. Parameters can be estimated given an option price, index, interest rate, and dividend history.

The Libor Market Model

Model Domain:

Yield Curves and Interest Rate Options.

Key Characteristics of the Model:

1. The model has arbitrage-free and physical settings, depending on whether the market price of risk is set to zero (arbitrage-free) or not (physical).

2. In the arbitrage-free setting, the model can reproduce market prices of bonds and fixed income options.

3. In the physical setting, the model can generate realistic (i.e. simulated historical) bond price scenarios.

4. The yield curve can undergo a variety of realistic non-parallel shifts.

5. The correlation structure of changes in the yield curve can be based on physical volatility data (historical time series) or current market volatility data (e.g. futures option prices).

Outline of Mathematical Formulation:

1. The yield curve can be modeled using different measures (e.g. forward measure, spot Libor measure).

2. We give the forward measure equations since the Hunter-Jäckel-Joshi predictor-corrector method is useful in pricing interest-indexed products.

3. Bond prices divided by the numeraire are martingales.

4. Forward Libor interest rates are assumed to be lognormally distributed.

5. Discrete tenors (zero-coupon bonds maturing integral periods of time from the initial date) are assumed. A quarterly tenor can be used for scenario generation and an annual tenor for interest-indexed product pricing.

6. Natural cubic spline interpolation is used to derive bond prices at other maturities in the scenario generator.

Key Equations (Forward measure):

$$L_n(t)=(1/\delta)[B(t,T_n)/B(t,T_{n+1})-1]$$

$$dL_{n-1}(t)=L_{-1}(t)\gamma_{n-1}(t).dW_n(t)$$

$$dW_{n+1}(t)=dW_n(t)+\delta_n(t)L_n(t)/(1+\delta L_n(t))dt$$

What The Variables Mean:

$B(t,T_n)$ is the price at time t of a bond maturing at time $T_n$,

δ is the common spacing between $T_0, T_1, \ldots T_n$, $L_n(t)$ is a forward Libor rate at time t, $dW_n(t)$ is an increment in d-dimensional Brownian motion at time t, $\gamma_{n-1}(t)$ is a d-dimensional vector volatility function, and . is the inner product of two d-dimensional vectors.

Despite the name "Libor Market Model", there is no bar to applying the model to Treasury rates.

NA-GARCH Model

As described above, the NA-GARCH model for evolution of the index assumes that the following equation holds:

$$\ln(S_{t+1}/S_t)=(r_f-d)+\lambda h_t^{1/2}-\tfrac{1}{2}h_t+h_t^{1/2}v_{t+1}$$

This equation can clearly be transformed to the equivalent $$S_{t+1}=S_t*\exp(r_f-d)*\exp(\lambda h_t^{1/2}-\tfrac{1}{2}h_t+h_t^{1/2}v_{t+1}),$$

in which the interest rate term and noise terms have been separated. By induction we can write:

$$S_T=S_0*\exp((r-d)*T)*\Pi\exp(\lambda h_t^{1/2}-\tfrac{1}{2}h_t+h_t^{1/2}v_{t+1}), \text{ or}$$

$$S_T=S_0*\exp(r*T)*\exp(-d*T)*\Pi\exp(\lambda h_t^{1/2}-\tfrac{1}{2}h_t+h_t^{1/2}v_{t+1})$$

where r and d are now continuously compounded rates, T is the terminal date, and all the random variation is contained in the product (Π) terms. The following $\exp(r*T)$ can be referred to as an "accumulation factor" as described below.

To calculate an option price, a discount factor must be used to calculate the discounted expectation of the excess of the terminal index $S_T$ over the strike price. In the constant interest rate case the discount factor is just the reciprocal of the accumulation factor, i.e. $\exp(-r*T)$, but as described below there it is sometimes useful to allow them to be different.

We refer to the ability to separate the accumulation factor from the random variation term as the "factoring property" of NA-GARCH. Practically it has at least three very important implications for the index-offset deposit product pricing program:

1) For use in Monte Carlo simulations in which interest rates vary, one set of NA-GARCH index scenarios can be precalculated assuming an interest rate of zero. This set can then be adjusted to be consistent with any desired interest rate simply by multiplying by the correct $\exp(r*T)$ term;

2) Similarly, for use in Monte Carlo simulations in which computation of sensitivities to changes in interest rates is desired, for instance in selecting and testing the appropriate fixed-income investment strategy for the product, one set of NA-GARCH index scenarios can be precalculated assuming an interest rate of zero. This set can then be adjusted to be consistent with any set of perturbed yield curves by making a multiplicative adjustment; and 3) It is possible to apply different accumulation and discount factors without recomputing the index paths, and this is crucial in the application of forward measure models, as described next.

Terminal measure, which is defined as forward measure in which the numeraire is the longest-term bond in the model, is convenient for discounting in this case. In a forward measure model the discount factor for a European option is always the price of a zero-coupon bond maturing when the option expires, allowing considerable simplification. It does not follow from this that the accumulation factor is just the reciprocal of the zero-coupon bond price, however: although the integrated short rate is not used directly for discounting, the Libor market model analog to the integrated short rate (the spot Libor process) is used to generate the index paths.

For example, with a forward measure predictor-corrector model, for a product with a five-year term and annual indexing to the 5-year zero-coupon Treasury, only five annual steps must be taken to get to the end of the product term with a set of simulated Treasury-indexed index credit components. The longest bond required to complete the simulation is one with a ten-year maturity at the time of product issue (i.e. reducing to five-year by product maturity).

This leaves the problem of how to generate a consistent set of indexed index credit components. Approximate index scenario values at the end of the product term can be computed by multiplying a) an approximate accumulation factor equal to the reciprocal of the 5-year zero-coupon bond price at issue by b) a set of NA-GARCH index scenario values computed with an interest rate of zero, i.e. with the interest rate dependence factored out.

This approach only provides an approximation to truly arbitrage-free index scenarios in the stochastic interest rate case, however. This is easy to see because in the limiting case if we worked in the five year forward measure, index scenario paths would be driven by only one source of noise (NA-GARCH index volatility) in the forward-measure model, while they would be driven by two (interest rate accumulation factor and NA-GARCH index volatility) in the spot Libor measure. This suggests that using the spot Libor process to generate the index paths (with the spot Libor process generated using the forward measure) would give the exact result.

In fact, Theorem 2 of Geman, El Karoui, and Rochet gives the price of a European option call option at time 0 ($C(0)$) with strike K expiring at time T as:

$$C(0)=B(0,T)E^T[(S(T)-K)^+]$$

where we have modified the notation slightly from the original paper for clarity. The price today of a zero-coupon bond maturing T years from now is $B(0,T)$, and $E^T$ denotes expectation under the T-forward measure, i.e. using the zero-coupon bond maturing at time T as the numeraire. Since the expectation of a function of $S(T)$ is to be taken under the T-forward measure, the terminal index itself $S(T)$ must be generated under the same measure. This is most easily done in a simulation model by generating the terminal values of the spot Libor process under the T-forward measure.

We can extend this reasoning to the index-offset deposit product, which has both index-linked and fixed-income-linked index credit components, although it is more convenient to perform the simulation in a different numeraire based on the sum of the length of the product term and the term of the longest bond to which credits are indexed. For example, for a five-year product indexed to a five-year bond, and to an index as well, it is convenient to perform the simulation using the ten-year bond as numeraire. The spot Libor process is simulated only to year five, since the behavior of the index after the end of the product term is irrelevant.

The plurality of index credit components (i.e., one or more fixed-income-linked components and one or more index-linked components) can then be calculated and combined in accordance with the product's crediting formula to determine the scenario-specific nonnegative index credit at the end of the term. Following Musiela & Rutkowski's equation (13.36), this scenario-specific index credit is accumulated to the terminal date (in this example ten years from product issue) using the then-current 5-year zero-coupon bond price. The discounted value of the index credit for the scenario can then be found by multiplying this accumulated amount by the ten-year zero coupon bond price at issue.

The price of the index credit is then determined by averaging these discounted values over a number of scenarios. We typically run 50,000 scenarios in the Delphi implementation, but the precise number will depend on the accuracy required and the run-time available.

Index Offset Deposit Product Pricing Programs—Detailed Description and Method of Operation Different implementations have been provided to enable different product configurations and to show how to handle both constant and stochastically varying interest rates, how different integration methods can be used, how averaging of ending values of the index can be incorporated as well as a point-to-point (European) payoff structure, and to show how different types of externally indexed interest rates, such as Constant Maturity Treasury rates and zero-coupon bond yields can be incorporated into the product.

Method of Operation

The program may be run as a command line in the APL interpreter. The program is written to run under the APL+Win interpreter marketed by APL2000 (www.apl2000.com) which has a full-screen windowing facility to allow for interactive editing of programs and display of output.

Exemplary embodiments of the present invention have been described. Those skilled in the art will understand, however, that changes and modifications may be made to these arrangements without departing from the true scope and spirit of the present invention, which is defined by the claims.

We claim:

1. A computer-based method for calculating an amount to be credited to an index-offset deposit product, the index-offset deposit product comprising an account value A, an indexing term T, and a credit value C based on at least one index I, the method comprising the steps of:
  computing a starting average index value S as an average of values of said at least one index I over a set of dates D1 within the indexing term T,
  computing an ending average index value E as an average of values of said at least one index I over a set of dates D2 within the indexing term T, and
  computing said credit value C as a function of the starting average index value S, the ending average index value E, and the account value A.

2. The computer-based method of claim 1 wherein said index-offset deposit product comprises an indexed annuity.

3. The computer-based method of claim 1 wherein said at least one index I comprises at least one published index.

4. The computer-based method of claim 1 wherein said at least one index I is based on a blend of one or more published indices.

5. The computer-based method of claim 1 wherein said at least one index I comprises a weighted average of a plurality of indices wherein the weights used to calculate the average are set at a start of the indexing term T.

6. The computer-based method of claim 5 wherein the weights used to calculate said average are set at the start of the indexing term T and the weights remain constant thereafter.

7. The computer-based method of claim 1 wherein said at least one index I comprises a weighted average of a plurality of indices wherein the weights used to calculate the average are set at the start of the indexing term T and change at discrete intervals during the indexing term T.

8. The computer-based method of claim 1 wherein the latest date in the set of dates D1 is no later than the earliest date in the set of dates D2.

* * * * *